United States Patent
Kim et al.

(10) Patent No.: US 10,496,434 B2
(45) Date of Patent: Dec. 3, 2019

(54) ELASTIC SCALING JOB THREAD POOL IN A CLOUD EVENT PROCESS INFRASTRUCTURE

(71) Applicant: EMC IP Holding Company LLC, Hopkinton, MA (US)

(72) Inventors: Ken Kim, Worcester, MA (US); Muzhar S. Khokhar, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 122 days.

(21) Appl. No.: 15/797,123

(22) Filed: Oct. 30, 2017

(65) Prior Publication Data

US 2019/0129747 A1 May 2, 2019

(51) Int. Cl.
*G06F 9/46* (2006.01)
*G06F 9/48* (2006.01)
*G06F 9/50* (2006.01)

(52) U.S. Cl.
CPC ............ *G06F 9/466* (2013.01); *G06F 9/4881* (2013.01); *G06F 9/5038* (2013.01)

(58) Field of Classification Search
CPC ....... G06F 9/45558; G06F 2009/45595; G06F 8/658; G06F 8/65
USPC ....................................................... 718/101
See application file for complete search history.

(56) References Cited

U.S. PATENT DOCUMENTS

| | | | |
|---|---|---|---|
| 8,261,295 B1* | 9/2012 | Risbood | G06F 9/44505 |
| | | | 719/328 |
| 9,020,802 B1 | 4/2015 | Florissi et al. | |
| 9,245,048 B1 | 1/2016 | Bent et al. | |
| 9,280,381 B1 | 3/2016 | Florissi et al. | |
| 9,367,573 B1 | 6/2016 | Goyal | |
| 9,703,800 B1 | 7/2017 | Korshunov et al. | |
| 9,767,139 B1 | 9/2017 | Bent et al. | |
| 2017/0012906 A1* | 1/2017 | Szilagyi | H04L 49/9005 |
| 2017/0109193 A1* | 4/2017 | Tian | G06F 9/45558 |
| 2017/0207968 A1* | 7/2017 | Eicken | H04L 41/0843 |
| 2017/0251013 A1* | 8/2017 | Kirti | H04L 63/1416 |
| 2017/0300361 A1* | 10/2017 | Lanka | G06F 9/4881 |

* cited by examiner

*Primary Examiner* — John Q Chavis
(74) *Attorney, Agent, or Firm* — BainwoodHuang

(57) ABSTRACT

Techniques for processing large data sets in parallel in a cloud-networked environment. The cloud-networked environment includes a plurality of remote systems and a cloud-based management system. The cloud-based management system can receive a large set of events from the respective remote systems, place the events, in the order they are received, in a task queue of an elastic scalable thread pool including a plurality of processing threads, process the respective events in the queue asynchronously and in parallel by the plurality of processing threads to produce a plurality of transaction outcomes, respectively, and generate a stream of the transaction outcomes in the same serial order as the events corresponding to the respective outcomes were received. By generating an ordered serial stream of transaction outcomes that corresponds to the respective events placed in the task queue, an analysis of conditions underlying the respective events can be performed more efficiently and accurately.

20 Claims, 3 Drawing Sheets

ELASTIC SCALING JOB THREAD POOL IN A CLOUD EVENT PROCESS INFRASTRUCTURE

BACKGROUND

In a cloud-networked environment, the MapReduce programming model is frequently employed for processing massive amounts of data in parallel. For example, such massive amounts of data (also referred to herein as "events") may be received at a cloud-based management system configured to monitor a multitude of remote computerized systems. Such events may be sent by the multitude of remote computerized systems over a remote services network to the cloud-based management system in response to changes in the status and/or performance of the respective remote systems, possibly resulting in an event storm at the cloud-based management system. To process events received during the period of such an event storm, the cloud-based management system may execute a map procedure to perform mapping operations on the events, followed by a reduce procedure to perform reducing and aggregation operations on the mapped events, each in accordance with the MapReduce programming model.

SUMMARY

In a storage system environment, such a cloud-based management system may be employed to monitor the status and/or performance, as well as analyze the operation of a multitude of data storage systems. As in the typical cloud-networked environment, massive amounts of data or events may be sent by the multitude of data storage systems over a remote services network to the cloud-based management system in response to changes in the status and/or performance of the respective storage systems, again possibly resulting in an event storm at the cloud-based management system. In the storage system environment, however, using the MapReduce programming model to process events received at the cloud-based management system during an event storm can be problematic. For example, the MapReduce programming model may be used to perform mapping, reducing, and aggregation operations on large sets of event data, which are typically maintained in a multi-node cluster. However, an unwanted latency time may be incurred while waiting for the mapping, reducing, and aggregation operations of the MapReduce programming model to complete.

Such latency time can be lessened by placing the events received during an event storm in a task queue of a thread pool, and using a plurality of processing threads of the thread pool to execute multiple event tasks in parallel. In the storage system environment, however, using a plurality of processing threads of a thread pool to process a massive amount of events can also be problematic, due to the need to maintain order in the outcomes produced by the respective processing threads. For example, as described herein, a cloud-based management system may be employed in the storage system environment to monitor the status and/or performance, as well as analyze the operation of a multitude of data storage systems. Such an analysis of the operation of a data storage system may involve receiving, in serial sequential order, a plurality of correlated events pertaining to, for example, a read/write error on a disk drive, an error in generating a logical unit (LUN) on the disk drive, an error in creating a snapshot of the LUN on the disk drive, etc. Such a disk error, a LUN error, a snapshot error, etc., can be analyzed by a plurality of processing threads of a thread pool executing in parallel. However, unless the outcomes produced by the respective processing threads are maintained in the same serial sequential order as the correlated events corresponding to the outcomes were received, it would be difficult, if not impossible, for the cloud-based management system to determine the root cause of the disk error, the LUN error, the snapshot error, etc., occurring at the data storage system.

Improved systems, methods, and techniques are disclosed herein for processing massive amounts of data in parallel in a cloud-networked environment. The cloud-networked environment can include a plurality of remote computerized systems, a cloud-based management system, and a network interconnecting the cloud-based management system and the respective remote systems. The cloud-based management system can be configured to implement (i) an elastic scalable thread pool including a variable number of processing threads operating asynchronously and in parallel, (ii) a serialization stream processing thread for synchronously generating an ordered serial stream of transaction outcomes produced by the respective processing threads, and (iii) a data repository for storing and persisting the ordered transaction outcomes. In response to changes in the status and/or performance of the plurality of remote computerized systems, multiple large sets of data or events can be simultaneously received at the cloud-based management system over the network from the respective remote systems, possibly resulting in an event storm at the cloud-based management system. The cloud-based management system can place each large set of events, serially in the order the events are received, in a task queue of the elastic scalable thread pool, and determine the number of processing threads (e.g., by creating one or more processing threads and adding them to the thread pool, destroying one or more processing threads and removing them from the thread pool) based at least on the required current size of the task queue. The plurality of processing threads of the elastic scalable thread pool can process the respective events in the task queue asynchronously, in parallel, and in a substantially continuous (e.g., streaming) feed fashion, thereby allowing results of event handling to be produced progressively, without having to wait until the full completion of the event handling. The plurality of processing threads of the elastic scalable thread pool can also set status flags once the transaction outcomes of the processing of the respective events have been produced. The serialization stream processing thread can poll or otherwise check the status flags of the plurality of processing threads, and, based on the settings of the status flags, generate a stream of the transaction outcomes in the same serial sequential order as the events corresponding to the transaction outcomes were received at the cloud-based management system. The cloud-based management system can then store and persist the ordered transaction outcomes in the data repository.

By providing a technique for processing massive amounts of data in parallel in a cloud-networked environment that includes (i) receiving large sets of events at a cloud-based management system, (ii) placing each large set of events, in the order the events are received, in a task queue of an elastic scalable thread pool, (iii) processing the respective events in the task queue asynchronously and in parallel by a plurality of processing threads to produce a plurality of transaction outcomes, respectively, and (iv) generating a stream of the transaction outcomes in the same serial sequential order as the events corresponding to the respective outcomes were received at the cloud-based management system, a subsequent analysis of possible error conditions underlying the received events can be performed more efficiently and with increased accuracy.

In certain embodiments, a method of processing massive amounts of data in parallel in a cloud-networked environment includes receiving, in a serial sequential order, a large set of events at an elastic scalable thread pool. The elastic scalable thread pool includes a task queue, a variable number of processing threads, and a serialization stream processing thread separate from the plurality or processing threads. The method further includes placing the large set of events, in the serial sequential order, in the task queue of the elastic scalable thread pool, processing the respective events in the task queue asynchronously and in parallel by the plurality of processing threads to produce a plurality of transaction outcomes, respectively, and generating, by the serialization stream processing thread, a stream of the transaction outcomes in the same serial sequential order as the events corresponding to the respective transaction outcomes were received. The method still further includes performing an analysis of possible error conditions underlying the received large set of events based on the stream of the transaction outcomes.

In certain further embodiments, a system for processing massive amounts of data in parallel in a cloud-networked environment includes a cloud-based management system including an elastic scalable thread pool and a serialization stream processing thread. The elastic scalable thread pool includes a task queue and a variable number of processing threads, and the serialization stream processing thread is separate from the variable number of processing threads. The cloud-based management system is configured to receive, in a serial sequential order, a large set of events at the elastic scalable thread pool, and to place the large set of events, in the serial sequential order, in the task queue. The plurality of processing threads are configured to process the respective events in the task queue asynchronously and in parallel to produce a plurality of transaction outcomes. The serialization stream processing thread is configured to generate a stream of the transaction outcomes in the same serial sequential order as the events corresponding to the respective transaction outcomes were received. The cloud-based management system is further configured to perform an analysis of possible error conditions underlying the received large set of events based on the stream of the transaction outcomes.

Other features, functions, and aspects of the invention will be evident from the Detailed Description that follows.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Improved systems, methods, and techniques are disclosed herein for processing massive amounts of data in parallel in a cloud-networked environment. The cloud-networked environment can include a plurality of remote computerized systems and a cloud-based management system. The cloud-based management system can receive large sets of data (also referred to herein as "events") from the respective remote systems, place each large set of events, in the order the events are received, in a task queue of an elastic scalable thread pool including a plurality of processing threads, process the respective events in the task queue asynchronously and in parallel by the plurality of processing threads to produce a plurality of transaction outcomes, respectively, and generate a stream of the transaction outcomes in the same serial sequential order as the events corresponding to the respective outcomes were received at the cloud-based management system. By generating an ordered serial stream of transaction outcomes that corresponds to the respective events placed in the task queue of the elastic scalable thread pool, a subsequent analysis of possible error conditions underlying the respective events can be performed more efficiently and with increased accuracy.

Figure 1:
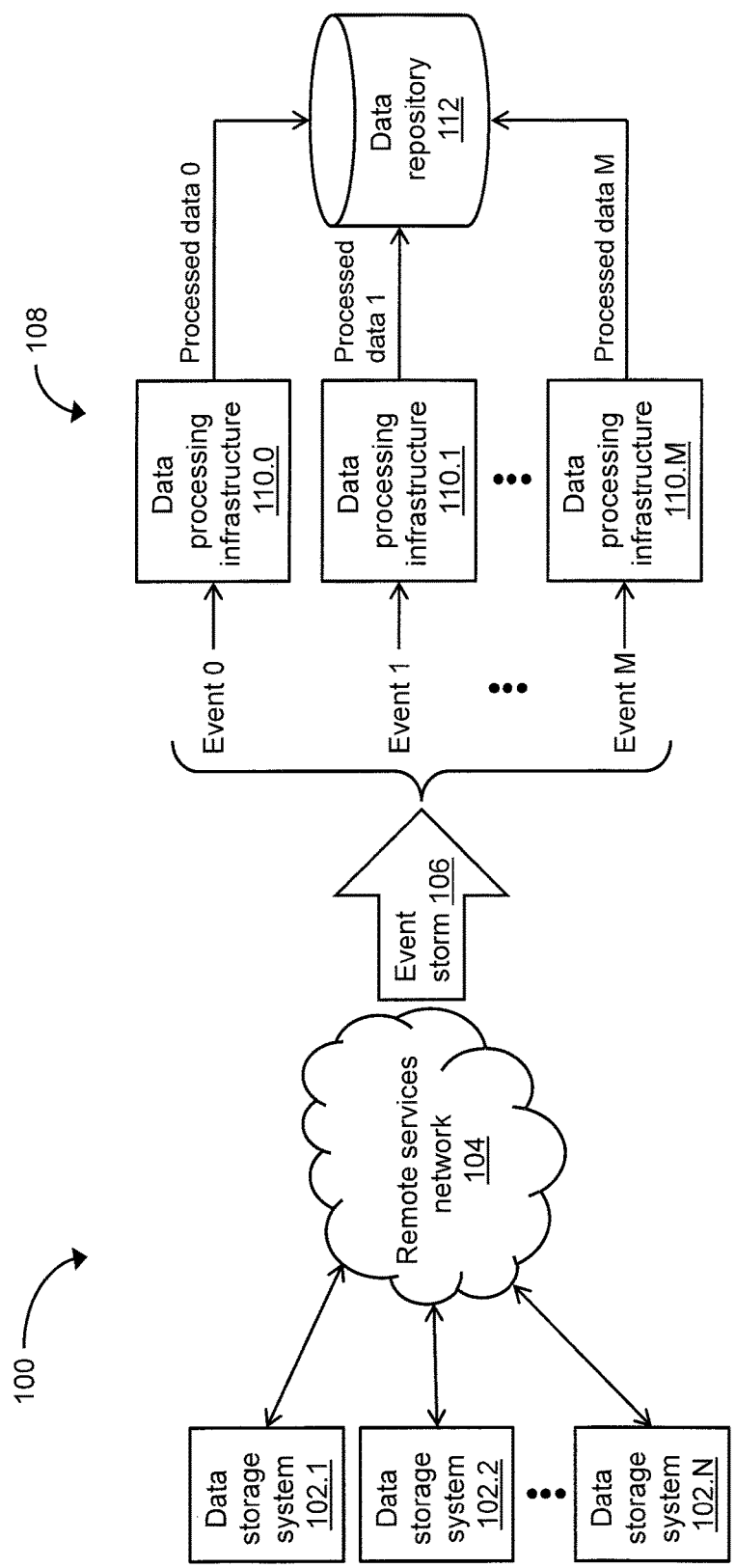
FIG. 1 is a block diagram of a first exemplary cloud-networked environment for processing massive amounts of data in parallel, including a cloud-based management system configured to implement a plurality of infrastructures for processing the massive amounts of data, and a data repository for storing and persisting the processed data.

FIG. 1 depicts an illustrative embodiment of a first exemplary cloud-networked environment 100 for processing massive amounts of data in parallel. For example, the cloud-networked environment 100 can correspond to a storage system environment. As shown in FIG. 1, the cloud-networked environment 100 can include a multitude of data storage systems 102.1, 102.2, . . . , 102.N, a cloud-based management system 108, and a remote services network 104 interconnecting the data storage systems 102.1, 102.2, . . . , 102.N and the cloud-based management system 108. The cloud-based management system 108 can include a plurality of infrastructures 110.0, 110.1, . . . , 110.M for processing the massive amounts of data in parallel, as well as a data repository 112 for storing and persisting the processed data. For example, each of the plurality of data processing infrastructures 110.0, 110.1, . . . , 110.M can be implemented as a microservice that can be deployed independently for processing such massive amounts of data in parallel. In the cloud-networked environment 100, the cloud-based management system 108 is configured to receive large sets of data or events from some or all of the multitude of data storage systems 102.1, 102.2, . . . , 102.N, and to monitor the status and/or performance of the respective storage systems 102.1, 102.2, . . . , 102.N based on the received large sets of events. Such events may be sent by the multitude of data storage systems 102.1, 102.2, . . . , 102.N over the remote services network 104 to the cloud-based management system 108 in response to changes in the status and/or performance of the respective storage systems 102.1, 102.2, . . . , 102.N, possibly resulting in an event storm 106 at the cloud-based management system 108.

To process a large set of events 0, 1, . . . , M received during the period of the event storm 106, the cloud-based management system 108 is further configured to provide (typically by human user intervention) a number of instances of the data processing infrastructures 110.0, 110.1, ..., 110.M that generally corresponds to the number of events 0, 1, ..., M to be processed. The plurality of data processing infrastructures 110.0, 110.1, ..., 110.M each typically conform to a synchronous single-threaded flow model, providing processed data 0, 1, ..., M corresponding to the events 0, 1, ..., M, respectively, for storage and persistence in the data repository 112.

The cloud-networked environment 100 for processing massive amounts of data in parallel has deficiencies, however, in that the need to add (or remove) one or more instances of the data processing infrastructures 110.0, 110.1, ..., 110.M by human user intervention based on the number of events 0, 1, ..., M to be processed can be inefficient and require virtually continuous manual monitoring of incoming event traffic. In addition, in the cloud-networked environment 100, the order of the processed data 0, 1, ..., M produced by the respective processing infrastructures 110.0, 110.1, ..., 110.M is not readily maintained relative to the corresponding incoming stream of events 0, 1, ..., M, making it difficult, if not impossible, for the cloud-based management system 108 to determine the root cause of possible error conditions underlying the received stream of events.

Figure 2:
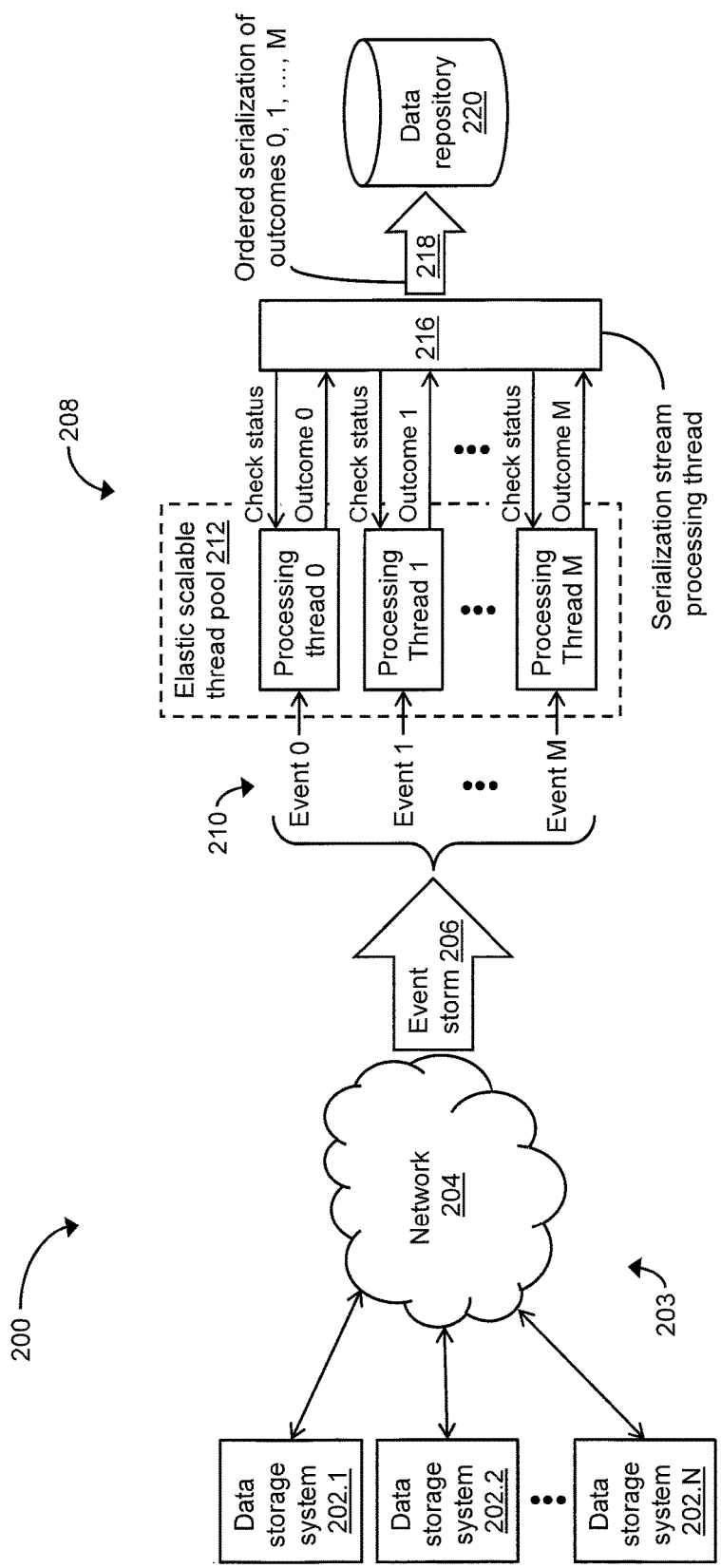
FIG. 2 is a block diagram of a second exemplary cloud-networked environment for processing massive amounts of data in parallel, including a cloud-based management system configured to implement an elastic scalable thread pool including a plurality of processing threads, a serialization stream processing thread for generating an ordered serial stream of transaction outcomes produced by the respective processing threads, and a data repository for storing and persisting the ordered transaction outcomes.

FIG. 2 depicts an illustrative embodiment of a second exemplary cloud-networked environment 200 for processing massive amounts of data in parallel. Like the cloud-networked environment 100 of FIG. 1, the cloud-networked environment 200 of FIG. 2 can correspond to a storage system environment. As shown in FIG. 2, the cloud-networked environment 200 can include a multitude of data storage systems 202.1, 202.2, ..., 202.N, a cloud-based management system 208, and a communications medium 203 including at least one network 204 (such as a remote services network) interconnecting the data storage systems 202.1, 202.2, ..., 202.N and the cloud-based management system 208. In the storage system environment, each of the multitude of data storage systems 202.1, 202.2, ..., 202.N can receive, over the network 204, input/output (I/O) requests (e.g., small computer system interface (SCSI) commands) from one or more host computers (e.g., web server computers, file server computers, email server computers, enterprise server computers, etc.), directing the respective storage systems 202.1, 202.2, ..., 202.N to store and/or retrieve data blocks from logical storage units (LUNs) and/or virtual volumes (VVOLs) on behalf of the respective host computers (not shown).

The communications medium 203 including the network 204 can be configured to interconnect the multitude of data storage systems 202.1, 202.2, ..., 202.N, the cloud-based management system 208, as well as the host computers (not shown), to enable the respective data storage systems, cloud-based management system, and host computers to communicate and exchange signaling. As shown in FIG. 2, at least a portion of the communications medium 203 is illustrated as a "cloud" to indicate that the communications medium 203 can have a variety of different topologies, including, but not limited to, a backbone topology, a hub-and-spoke topology, a loop topology, an irregular topology, or any suitable combination thereof. The communications medium 203 can also include, but is not limited to, copper-based data communications devices and cabling, fiber optic-based devices and cabling, wireless devices, or any suitable combination thereof. In addition, the communications medium 203 can be configured to support storage area network (SAN)-based communications, local area network (LAN)-based communications, cellular communications, wide area network (WAN)-based communications, distributed infrastructure communications, and so on, or any suitable combination thereof. As further shown in FIG. 2, the cloud-based management system 208 can be configured to implement an elastic scalable thread pool 212 including a variable number of processing threads 0, 1, ..., M operating asynchronously and in parallel, a serialization stream processing thread 216 separate from the elastic scalable thread pool 212 for synchronously generating an ordered serial stream of transaction outcomes 0, 1, M produced by the respective processing threads 0, 1, ..., M, and a data repository 220 for storing and persisting the ordered transaction outcomes 0, 1, ..., M.

The functionality of the cloud-based management system 208 can be implemented by deploying one or more microservices, each of which can be viewed as an element of functionality of an application. For example, an application having a microservices architecture can place each element of its functionality into a separate microservice. Each such microservice is scalable, and can be independently deployed in any suitable combination of servers, virtual machines, and/or containers. In one embodiment, the cloud-based management system 208 can employ a host operating system (e.g., the Linux operating system, or any other suitable operating system) that includes a container engine (e.g., the Docker™ container engine, or any other suitable container engine) for creating and managing such containers. In such an embodiment, the cloud-based management system 208 can be configured to run from a microservice deployed as an independent virtual system, in accordance with the Cloud Foundry deployment model using the Docker™ container management framework.

A computer program product can be configured to deliver all or a portion of the programmed functionality of the cloud-based management system 208. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by one or more of the processors, perform the methods described herein. Such media may be considered to be articles of manufacture, and may be transportable from one management system to another management system, cloud-based or otherwise.

The systems, methods, and techniques disclosed herein for processing massive amounts of data in parallel in the cloud-networked environment 200 of FIG. 2 can be used to handle the processing of large sets of events sent over the network 204 by the multitude of data storage systems 202.1, 202.2, ..., 202.N. The cloud-based management system 208 can receive such large sets of events from the data storage systems 202.1, 202.2, ..., 202.N, process the respective events asynchronously and in parallel to produce a plurality of transaction outcomes, and generate a stream of the transaction outcomes in the same serial sequential order as the events corresponding to the respective outcomes were received. By generating an ordered serial stream of transaction outcomes that corresponds to the respective events received at the cloud-based management system 208, a subsequent analysis of possible error conditions underlying the respective events can be performed more efficiently and with increased accuracy.

The disclosed systems, methods, and techniques, as well as many of their attendant advantages, will be further understood with reference to the following illustrative example, and FIG. 2. In this example, the cloud-based management system 208 is employed in a storage system environment to monitor the status and/or performance, as well as analyze the operation of the multitude of data storage systems 202.1, 202.2, . . . , 202.N. In response to changes in their status and/or performance, the respective storage systems 202.1, 202.2, . . . , 202.N send large sets of events over the network 204 to the cloud-based management system 208, possibly resulting in an event storm 206 at the cloud-based management system 208. As shown in FIG. 2, the event storm 206 can include an exemplary large set of events 0, 1, . . . , M, which are received, in serial sequential order, for processing at the cloud-based management system 208. For example, the large set of events 0, 1, . . . , M may be a plurality of correlated events pertaining to, for example, a read/write error on a disk drive, an error in generating a logical unit (LUN) on the disk drive, an error in creating a snapshot of the LUN on the disk drive, etc. It is noted that the event storm 206 can include many large sets of events like the large set of events 0, 1, . . . , M.

In this example, the cloud-based management system 208 places the large set of events 0, 1, . . . , M, serially in the order the events 0, 1, . . . , M are received, in a task queue 210 of the elastic scalable thread pool 212, and determines the variable number of processing threads 0, 1, . . . , M in the thread pool 212 based at least on the required current size of the task queue 210. To that end, the cloud-based management system 208 can automatically and dynamically create one or more processing threads and add them to the thread pool 212, and/or destroy one or more processing threads and remove them to the thread pool 212, thereby assuring that a respective processing thread in the thread pool 212 is free and available to process each respective one of the events 0, 1, . . . , M in the task queue 210.

Having placed the large set of events 0, 1, . . . , M in the task queue 210 of the elastic scalable thread pool 212 and determined the variable number of processing threads 0, 1, . . . , M, the cloud-based management system 208 assigns the processing thread 0 to the event task 0, assigns the processing thread 1 to the event task 1, and so on, finally assigning the processing thread M to the event task M. The processing threads 0, 1, . . . , M then process the respective events 0, 1, . . . , M asynchronously and in parallel, and set status flags once the transaction outcomes 0, 1, M of the processing of the respective events 0, 1, . . . , M have been produced. As shown in FIG. 2, the serialization stream processing thread 216 synchronously polls or otherwise checks the status of event processing performed at the processing threads 0, 1, . . . , M, and streams out the respective transaction outcomes 0, 1, M based on the settings of the status flags. Specifically, the processing thread 216 first checks a status flag associated with the processing thread 0, and, if the status flag is set to indicate that the transaction outcome 0 of the processing of event 0 has been produced, streams out the transaction outcome 0 from the processing thread 0 of the thread pool 212 to the serialization stream processing thread 216. The processing thread 216 then checks another status flag associated with the processing thread 1, and, if the status flag is set to indicate that the transaction outcome 1 of the processing of event 1 has been produced, streams out the transaction outcome 1 from the processing thread 1 of the thread pool 212 to the serialization stream processing thread 216. Such polling/checking of the status flags associated with the processing threads 0, 1, . . . , M of the elastic scalable thread pool 212 continues in synchronous fashion until a further status flag associated with the processing thread M is finally polled/checked, and, if the status flag is set to indicate that the transaction outcome M of the processing of event M has been produced, the transaction outcome M is streamed out from the processing thread M of the thread pool 212 to the serialization stream processing thread 216.

Once the transaction outcomes 0, 1, M of the respective processing events 0, 1, . . . , M have all been streamed out of the elastic scalable thread pool 212, the serialization stream processing thread 216 generates an ordered serial stream 218 of the transaction outcomes 0, 1, . . . , M. Because the serialization stream processing thread 216 has checked the status of event processing at the respective processing threads 0, 1, . . . , M and streamed out the transaction outcomes 0, 1, M in synchronous fashion, the stream 218 of transaction outcomes 0, 1, M generated at the output of the processing thread 216 is in the same serial sequential order as the events 0, 1, . . . , M corresponding to the respective outcomes 0, 1, M were received at the cloud-based management system 208. In this example, the stream 218 of transaction outcomes 0, 1, M is generated in the same serial sequential order as the correlated events 0, 1, . . . , M pertaining to the read/write error on the disk drive, the error in generating the LUN on the disk drive, the error in creating the snapshot of the LUN on the disk drive, etc., were received. The cloud-based management system 208 then stores and persists the transaction outcomes 0, 1, . . . , M in the data repository 220, while maintaining their order in the stream 218. Because the transaction outcomes 0, 1, M produced by the respective processing threads 0, 1, . . . , M of the elastic scalable thread pool 212 are maintained in the same serial sequential order as the plurality of correlated events 0, 1, . . . , M corresponding to the outcomes 0, 1, M were received, the cloud-based management system 208 can subsequently perform an analysis of the disk, LUN, snapshot, etc., error conditions underlying the received events 0, 1, . . . , M to determine the root cause of the storage system errors more efficiently and with increased accuracy.

Figure 3:
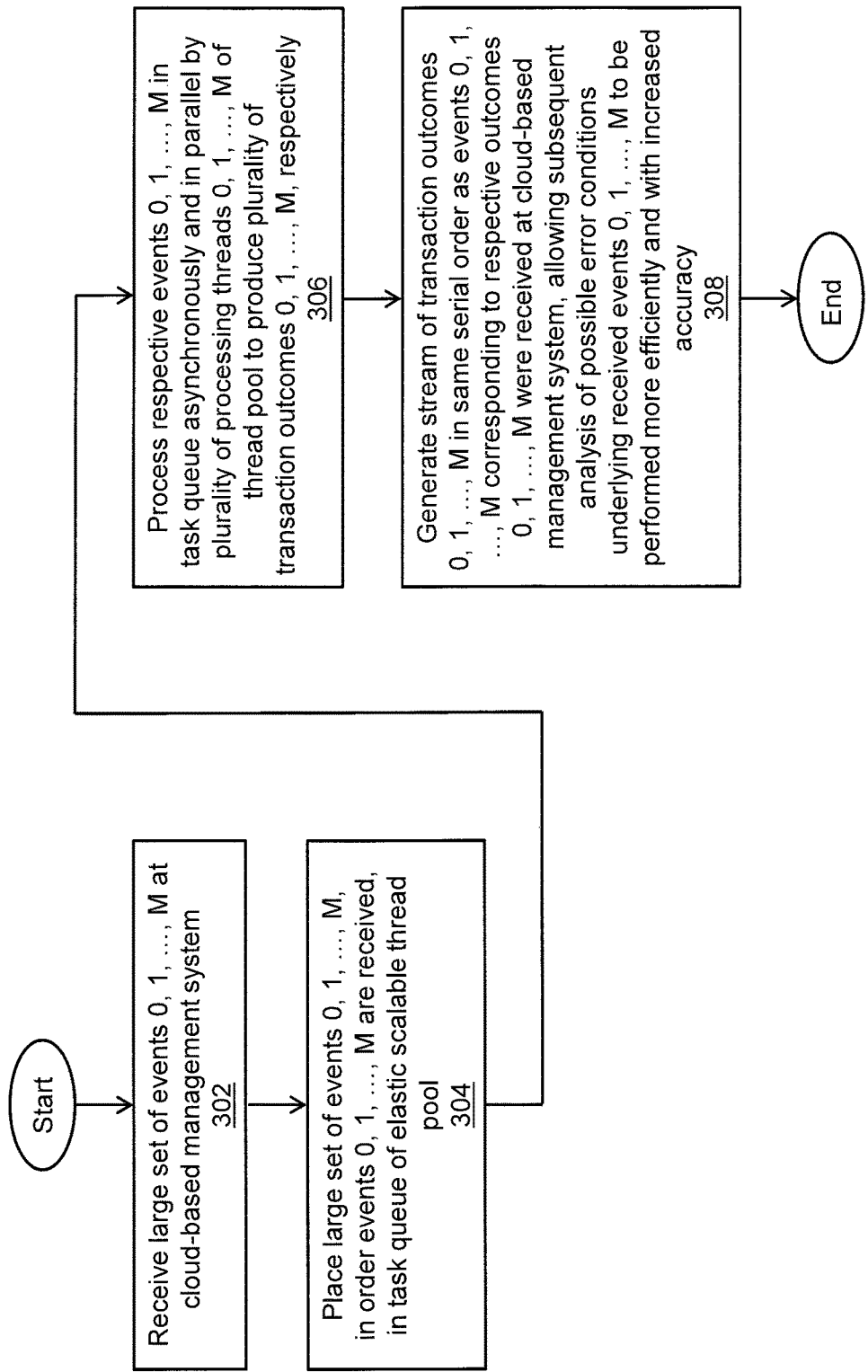
FIG. 3 is a flow diagram of an exemplary method of processing massive amounts of data in parallel in the cloud-networked environment of FIG. 2.

An exemplary method of processing massive amounts of data in parallel in a cloud-networked environment is described herein with reference to FIGS. 2 and 3. As depicted in block 302 (see FIG. 3), a large set of events 0, 1, . . . , M are received at the cloud-based management system 208 (see FIG. 2). As depicted in block 304, the large set of events 0, 1, . . . , M are placed, in the order the events 0, 1, . . . , M are received, in the task queue 210 of the elastic scalable thread pool 212. As depicted in block 306, the respective events 0, 1, . . . , M in the task queue 210 are processed asynchronously and in parallel by the plurality of processing threads 0, 1, . . . , M of the thread pool 212 to produce the plurality of transaction outcomes 0, 1, M, respectively. As depicted in block 308, a stream of the transaction outcomes 0, 1, M is generated in the same serial sequential order as the events 0, 1, . . . , M corresponding to the respective outcomes were received at the cloud-based management system 208, allowing a subsequent analysis of possible error conditions underlying the received events to be performed more efficiently and with increased accuracy.

Having described the above illustrative embodiments of the disclosed systems, methods, and techniques, other alternative embodiments, modifications, and/or variations may be made. For example, it was described herein that the cloud-based management system 208 can create one or more processing threads and add them to the elastic scalable thread pool 212, and/or destroy one or more processing threads and remove them from the elastic scalable thread pool 212, thereby assuring that a respective processing thread in the thread pool 212 is free and available to process each respective one of the events 0, 1, ..., M in the task queue 210. In certain alternative embodiments, to avoid a possible undesirable amount of processing overhead associated with the creation and/or destruction of processing threads, the cloud-based management system 208 can be configured to monitor the elastic scalable thread pool 212 to determine an availability of the respective processing threads 0, 1, ..., M, and reuse one or more of the processing threads 0, 1, ..., M for multiple event processing operations based on their availability, rather than creating processing threads as the event tasks are received. In certain further alternative embodiments, rather than destroying processing threads and removing them from the elastic scalable thread pool 212, the cloud-based management system 208 can be configured to at least temporarily terminate such processing threads or place them in a sleep mode, without removing the processing threads from the thread pool 212. In each embodiment described herein, the cloud-based management system 208 can be configured to monitor event traffic volume, and control the variable number of processing threads 0, 1, ..., M in the elastic scalable thread pool 212 in real-time based on the event traffic volume.

While various embodiments of the invention have been particularly shown and described, it will be understood by those skilled in the art that various changes in form and details may be made therein without departing from the scope of the invention as defined by the appended claims.

What is claimed is:

1. A method of processing massive amounts of data in parallel in a cloud-networked environment, comprising:
   receiving, in a serial sequential order, a large set of events at an elastic scalable thread pool, the elastic scalable thread pool including a task queue, a variable number of processing threads, and a serialization stream processing thread separate from the variable number of processing threads;
   placing the large set of events, in the serial sequential order, in the task queue of the elastic scalable thread pool;
   processing the respective events in the task queue asynchronously and in parallel by the variable number of processing threads to produce a plurality of transaction outcomes, respectively; and
   generating, by the serialization stream processing thread, a stream of the transaction outcomes in the same serial sequential order as the events corresponding to the respective transaction outcomes were received.

2. The method of claim 1 further comprising:
   performing an analysis of possible error conditions underlying the received large set of events based on the stream of the transaction outcomes.

3. The method of claim 1 further comprising:
   determining the variable number of processing threads in the elastic scalable thread pool based on a required current size of the task queue.

4. The method of claim 3 wherein the determining of the variable number of processing threads includes automatically and dynamically creating one or more processing threads and adding the created processing threads to the elastic scalable thread pool.

5. The method of claim 4 wherein the determining of the variable number of processing threads further includes destroying one or more processing threads and removing the destroyed processing threads from the elastic scalable thread pool.

6. The method of claim 1 further comprising:
   assigning each of the variable number of processing threads to a respective event among the large set of events.

7. The method of claim 6 further comprising:
   setting status flags once the transaction outcomes of the processing of the respective events by the variable number of processing threads have been produced.

8. The method of claim 7 further comprising:
   synchronously checking, by the serialization stream processing thread, the status flags corresponding to the respective processing threads.

9. The method of claim 8 further comprising:
   streaming out the respective transaction outcomes from the variable number of processing threads based on the setting of the status flags.

10. The method of claim 9 further comprising:
    having streamed out all of the respective transaction outcomes from the variable number of processing threads, generating the stream of the transaction outcomes in the same serial sequential order as the events corresponding to the respective transaction outcomes were received.

11. The method of claim 10 further comprising:
    storing and persisting the respective transaction outcomes, in the serial sequential order, in a data repository.

12. A system for processing massive amounts of data in parallel in a cloud-networked environment, comprising:
    a cloud-based management system including one or more processors configured to execute program instructions to:
      receive, in a serial sequential order, a large set of events at an elastic scalable thread pool, the elastic scalable thread pool including a task queue and a variable number of processing threads;
      place the large set of events, in the serial sequential order, in the task queue;
      process, by the variable number of processing threads, the respective events in the task queue asynchronously and in parallel to produce a plurality of transaction outcomes, respectively; and
      generate, by a serialization stream processing thread, a stream of the transaction outcomes in the same serial sequential order as the events corresponding to the respective transaction outcomes were received, the serialization stream processing thread being separate from the variable number of processing threads.

13. The system of claim 12 wherein the one or more processors are further configured to execute the program instructions to perform an analysis of possible error conditions underlying the received large set of events based on the stream of the transaction outcomes.

14. The system of claim 12 wherein the one or more processors are further configured to execute the program instructions to determine the variable number of processing threads in the elastic scalable thread pool based on a required current size of the task queue.

15. The system of claim 12 wherein the one or more processors are further configured to execute the program instructions to assign each of the variable number of processing threads to a respective event among the large set of events.

16. The system of claim 15 wherein the one or more processors are further configured to execute the program instructions to set, by the variable number of processing threads, status flags once the transaction outcomes of the processing of the respective events have been produced.

17. The system of claim 16 wherein the one or more processors are further configured to execute the program instructions to:
   synchronously check, by the serialization stream processing thread, the status flags corresponding to the respective processing threads;
   stream out, by the serialization stream processing thread, the respective transaction outcomes from the variable number of processing threads based on the setting of the status flags; and
   having streamed out all of the respective transaction outcomes from the variable number of processing threads, generate, by the serialization stream processing thread, the stream of the transaction outcomes in the same serial sequential order as the events corresponding to the respective transaction outcomes were received.

18. The system of claim 17 further comprising:
a data repository coupled to the one or more processors, the data repository being configured to store and persist the respective transaction outcomes in the serial sequential order.

19. A computer program product having a non-transitory computer readable medium that stores a set of instructions that, when carried out by computerized circuitry, cause the computerized circuitry to perform a method of processing massive amounts of data in parallel in a cloud-networked environment, the method comprising:
   receiving, in a serial sequential order, a large set of events at an elastic scalable thread pool, the elastic scalable thread pool including a task queue, a variable number of processing threads, and a serialization stream processing thread separate from the variable number of processing threads;
   placing the large set of events, in the serial sequential order, in the task queue of the elastic scalable thread pool;
   processing the respective events in the task queue asynchronously and in parallel by the variable number of processing threads to produce a plurality of transaction outcomes, respectively; and
   generating, by the serialization stream processing thread, a stream of the transaction outcomes in the same serial sequential order as the events corresponding to the respective transaction outcomes were received.

20. The method of claim 19 further comprising:
performing an analysis of possible error conditions underlying the received large set of events based on the stream of the transaction outcomes.

* * * * *